US009575543B2

(12) United States Patent
Conrad et al.

(10) Patent No.: US 9,575,543 B2
(45) Date of Patent: Feb. 21, 2017

(54) PROVIDING AN INTER-ARRIVAL ACCESS TIMER IN A PROCESSOR

(71) Applicant: Intel Corporation, Santa Clara, CA (US)

(72) Inventors: Neena Conrad, Hillsboro, OR (US); Shaun M. Conrad, Cornelius, OR (US); Stephen H. Gunther, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 13/685,853

(22) Filed: Nov. 27, 2012

(65) Prior Publication Data

US 2014/0149759 A1 May 29, 2014

(51) Int. Cl.
*G06F 1/32* (2006.01)

(52) U.S. Cl.
CPC ........... *G06F 1/3243* (2013.01); *G06F 1/3228* (2013.01); *Y02B 60/1239* (2013.01)

(58) Field of Classification Search
CPC .... G06F 1/3228; G06F 1/3243; G06F 1/3275; G06F 1/3215
See application file for complete search history.

(56) References Cited

U.S. PATENT DOCUMENTS

| 5,163,153 A | | 11/1992 | Cole |
|---|---|---|---|
| 5,253,214 A | * | 10/1993 | Herrmann ................ 365/233.14 |
| 5,473,572 A | * | 12/1995 | Margeson, III ............... 365/227 |
| 5,522,087 A | | 5/1996 | Hsiang |
| 5,590,341 A | | 12/1996 | Matter |
| 5,621,250 A | | 4/1997 | Kim |
| 5,781,783 A | * | 7/1998 | Gunther et al. .............. 713/320 |
| 5,905,901 A | * | 5/1999 | Klein ........................... 713/324 |
| 5,931,950 A | | 8/1999 | Hsu |
| 5,987,614 A | * | 11/1999 | Mitchell et al. .............. 713/300 |
| 6,085,330 A | * | 7/2000 | Hewitt ................. G06F 1/3203 711/146 |
| 6,151,262 A | * | 11/2000 | Haroun et al. ................ 365/227 |
| 6,748,546 B1 | | 6/2004 | Mirov et al. |
| 6,792,392 B1 | | 9/2004 | Knight |

(Continued)

FOREIGN PATENT DOCUMENTS

EP   1 282 030 A1   5/2003
JP   2006343946 A * 12/2006

OTHER PUBLICATIONS

SPEC-Power and Performance, Design Overview V1.10, Standard Performance Information Corp., Oct. 21, 2008, 6 pages.

(Continued)

*Primary Examiner* — Jaweed A Abbaszadeh
*Assistant Examiner* — Gary Collins
(74) *Attorney, Agent, or Firm* — Trop, Pruner & Hu, P.C.

(57) ABSTRACT

In an embodiment, a processor includes multiple cores each to independently execute instructions and a power control unit (PCU) coupled to the cores to control power consumption of the processor. In turn, the PCU includes a control logic to cause the processor to re-enter a first package low power state responsive to expiration of an inter-arrival timer, where this expiration indicates that a time duration subsequent to a transaction received in the processor has occurred. Other embodiments are described and claimed.

19 Claims, 8 Drawing Sheets

(56) References Cited

U.S. PATENT DOCUMENTS

| | | |
|---|---|---|
| 6,823,516 B1 | 11/2004 | Cooper |
| 6,829,713 B2 | 12/2004 | Cooper et al. |
| 6,976,122 B1* | 12/2005 | Sander et al. ............... 711/105 |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 8,650,422 B1* | 2/2014 | Goolsby .................. 713/322 |
| 2001/0044909 A1 | 11/2001 | Oh et al. |
| 2002/0194509 A1 | 12/2002 | Plante et al. |
| 2003/0061383 A1 | 3/2003 | Zilka |
| 2003/0101361 A1* | 5/2003 | Jain ................. G06F 1/3203 713/300 |
| 2003/0191915 A1* | 10/2003 | Saxena et al. ............... 711/160 |
| 2004/0059954 A1* | 3/2004 | Hoehler .................... 713/300 |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0230850 A1* | 11/2004 | Baumgartner et al. ....... 713/320 |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0047986 A1* | 3/2006 | Kurts ................. G06F 1/3203 713/320 |
| 2006/0050670 A1 | 3/2006 | Hillyard et al. |
| 2006/0053310 A1* | 3/2006 | Su ..................... G06F 1/3203 713/300 |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2006/0294406 A1* | 12/2006 | Cline ................. G06F 1/3215 713/320 |
| 2007/0005995 A1 | 1/2007 | Kardach et al. |
| 2007/0016817 A1 | 1/2007 | Albonesi et al. |
| 2007/0050653 A1* | 3/2007 | Verdun .................... 713/320 |
| 2007/0079294 A1 | 4/2007 | Knight |
| 2007/0106827 A1 | 5/2007 | Boatright et al. |
| 2007/0124607 A1* | 5/2007 | Fuchs ................ G06F 1/3228 713/300 |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2008/0288798 A1* | 11/2008 | Cooper et al. ................ 713/322 |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0264934 A1* | 10/2011 | Branover et al. ............. 713/320 |
| 2011/0264937 A1* | 10/2011 | Meisner et al. ............. 713/323 |
| 2012/0079290 A1 | 3/2012 | Kumar |
| 2012/0246506 A1 | 9/2012 | Knight |
| 2012/0311360 A1* | 12/2012 | Balasubramanian . G06F 1/3237 713/323 |
| 2014/0006824 A1* | 1/2014 | Maciocco et al. ........... 713/323 |
| 2014/0089590 A1* | 3/2014 | Biswas et al. ............... 711/128 |

OTHER PUBLICATIONS

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

* cited by examiner

PROVIDING AN INTER-ARRIVAL ACCESS TIMER IN A PROCESSOR

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

To conserve power, various power management schemes are utilized both within a processor of a system and other system components such as system memory and so forth. One technique to save on power consumption is to place a processor into a so-called package low power state in which all cores of the processor are in a lower power state in which the cores are not actively performing work. Oftentimes when in this package low power state, one or more cores of the processor will need to be awoken in order to handle a processing task such as a memory access request received from a peripheral device or other entity. When exiting this low power state, typically the processor remains in a higher power active state for a longer time than needed, namely for a fixed interval of time. This can lead to reduced power saving opportunities.

DETAILED DESCRIPTION

In various embodiments, a processor may be configured to provide a programmable value for determining an inactive time duration after receipt of an external transaction, when the processor is in a pop-up low power state after exiting a deeper low power state. Responsive to expiration of this programmable time duration indicating that an additional external transaction has not been received, a processor may re-enter the deeper low power state and furthermore may cause an associated system memory to also enter into a low power state. Thus using an embodiment of the present invention, a better decision can be made as to when to re-enter a deeper low power state after a pop-up low power state in which snoop/non-snoop transactions are handled.

To this end, processor logic may be used to track transactions that occur during such pop-up low power state and use that information as an input into the determination as to when to re-enter a given deeper low power state. In this way, embodiments prevent remaining in a pop-up low power state for longer than is necessary. For example, for wireless local area network (WLAN) traffic an average power savings can be achieved since a time much shorter than a fixed time (e.g., according to a fixed pop-up low power state of, for example, 20 microseconds (μs)) is needed to handle the incoming traffic. In addition, system thrashing can be reduced by preventing re-entry into a deep package low power state only to be woken up right away. In other words, re-entry into a deep package low power state can be avoided just as there is incoming traffic, which would result in either aborting the entry sequence or a wake up immediately after re-entry. As an example, a solid state drive access pattern can have burst lengths of approximately 80 μs, which would be interrupted by a fixed timer interval. Embodiments may further be used for scenarios in which a deep package low power state can be re-entered after waking up for a display buffer fill, which can occur on the order of every approximately 200 μs to 1 millisecond (ms), enabling realization of significant power saving. Although the scope of the present invention is not limited in this regard, deep low power state re-entry control as described herein can be implemented via firmware, hardware, software, and combinations thereof.

Figure 1:
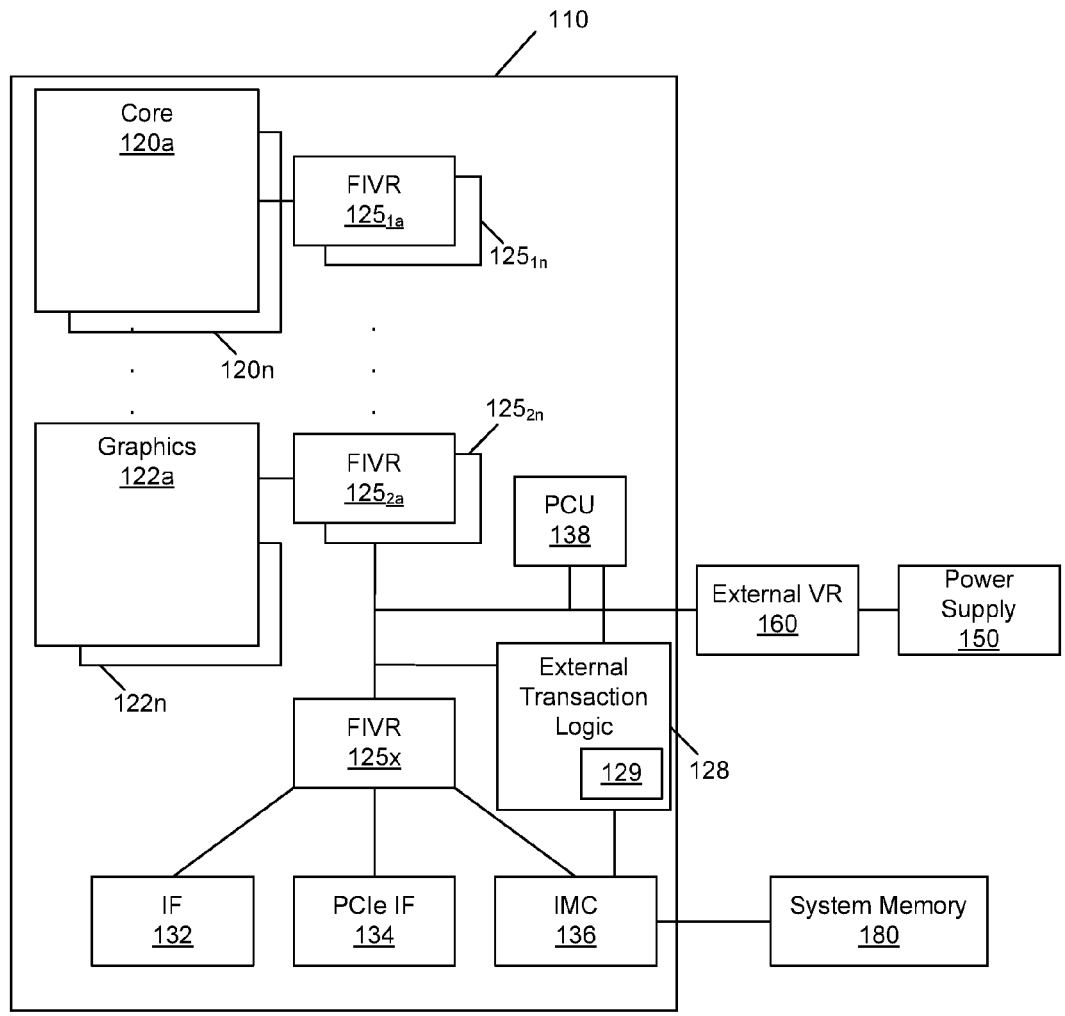
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_{1a}$-$125_{1n}$. Accordingly, a fully integrated voltage regulator (FIVR) implementation may be provided to allow for fine-grained control of voltage and thus power and performance of each individual core. In an embodiment, processor 110 may further include a plurality of graphics engines $122_a$-$122_n$, each also associated with a corresponding individual voltage regulator $125_{2a}$-$125_{2n}$. In this manner, these graphics engines also may have individually controlled voltage and performance levels. As such, each such processing engine can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller (IMC) 136. As seen, each of these components may be powered by another integrated voltage regulator 125$_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to perform operations with regard to package low power state re-entry and associated memory power management control in accordance with an embodiment of the present invention. Furthermore, PCU 138 may be coupled via a dedicated interface to external voltage regulator 160. In this way, PCU 138 can instruct the voltage regulator to provide a requested regulated voltage to the processor.

As further seen in FIG. 1, processor 110 also includes an external transaction logic 128. In different implementations, this logic may be part of system agent circuitry of the processor which may be implemented within uncore circuitry of the processor or a standalone system agent. In general, external transaction logic 128 provides arbitration and tracking operations with regard to transactions received in the processor from external sources such as peripheral devices, e.g., devices connected into a system via a universal serial bus (USB) connection. Other such devices may include content rendering devices such as audio and/or video devices. In some embodiments, external transaction logic 128 may also handle memory requests from on-chip agents such as one or more graphics engines and/or a display engine. As such, external transaction logic 128 can select appropriate transactions for passing via IMC 136 onto a system memory 180, which in an embodiment may be a dynamic random access memory (DRAM). Different structures may be present in this logic including various transaction queues, such as global write and read transaction queues and/or device-specific queues each associated with a particular device. Still further this logic may include an arbiter to arbitrate among incoming requests and provide a winning request to memory 180 via IMC 136.

External transaction logic 128 further includes a control logic 129 that can track transactions received during a pop-up low power state. By tracking such transactions, this logic can determine when a programmable period of time has occurred subsequent to such a transaction and to notify PCU 138 of this inter-arrival duration expiration. In an embodiment, this notification can be sent by a message communicated via a dedicated link between the external transaction logic and the PCU as shown in FIG. 1. Responsive to this indication of duration expiration, PCU 138 may take power management actions to cause processor 110 to re-enter a package deep low power state and to also initiate power management actions within system memory 180.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited. And further understand that while the embodiment shown in FIG. 1 is with regard to a multicore processor further including integrated graphics engines, other implementations can be used in connection with single core processors and/or multicore processors not including graphics engines (or including only a single such graphics engine).

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the power control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states).

When all cores of a multicore processor are in a core low power state, the processor can be placed in a package low power state, such as a package C6 low power state which is a deep low power state in which certain clock generation circuitry including phase locked loops (PLLs) are turned off, and core caches and core state are flushed to a shared cache memory, e.g., a last level cache. When a processor is in a package C6 state and incoming traffic is received, e.g., an incoming memory transaction, a pop-up package C2 state may be entered in which various non-core circuitry is powered up to handle the incoming transaction. In one such embodiment, PCU 138, external transaction logic 128, interfaces 132-134, IMC 136 and system memory 180 may be power enabled circuits in this pop-up package state. The incoming transaction may be a snoop transaction that seeks to determine the presence and state of data that may be in a processor cache. Or the incoming transaction may be a memory transaction directed to the system memory from a peripheral device or non-core circuit.

Figure 2:
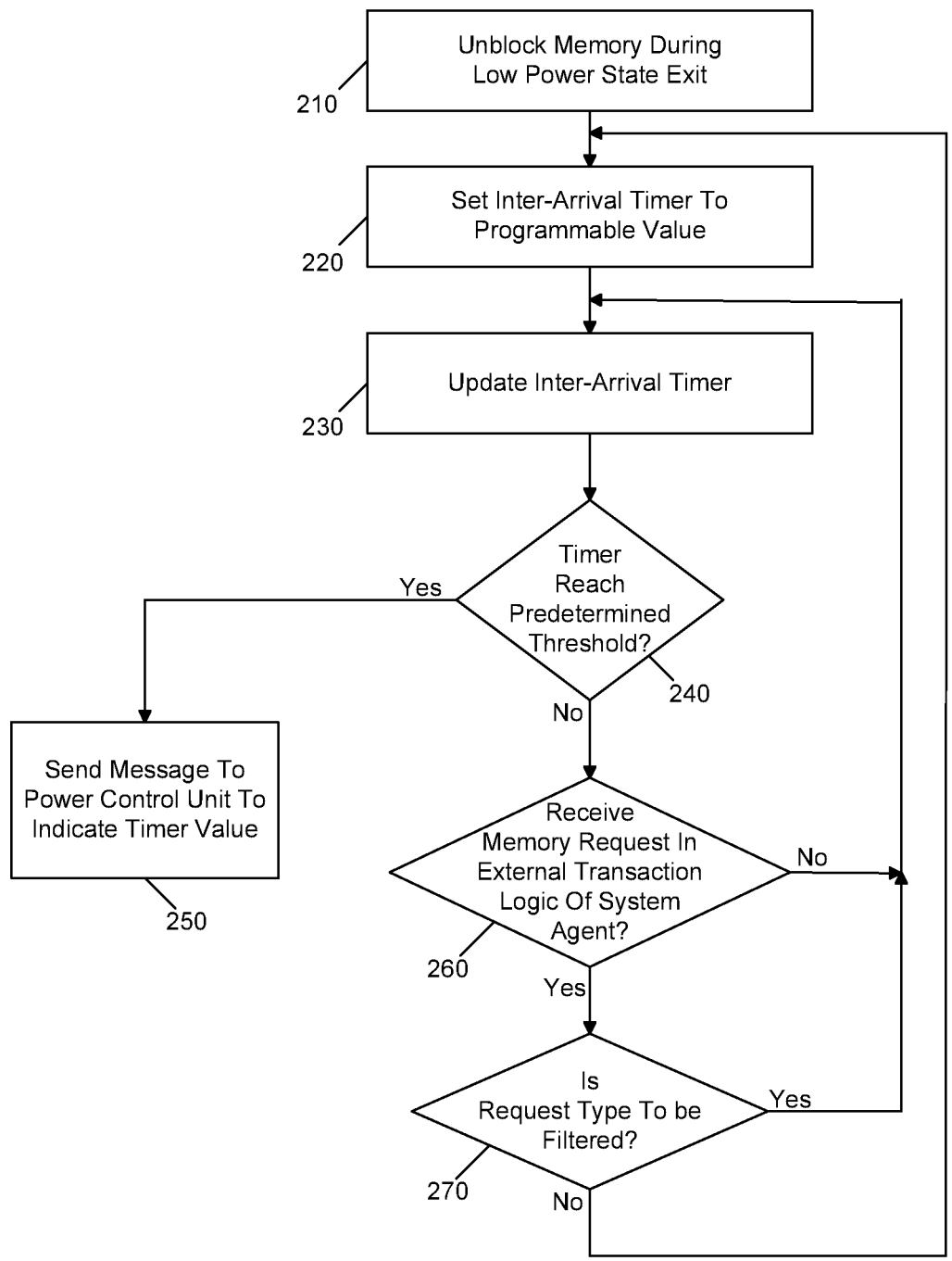
FIG. 2 is a flow diagram of a method in accordance with an embodiment of the present invention.

Referring now to FIG. 2, shown is a flow diagram of a method in accordance with an embodiment of the present invention. As shown in FIG. 2, method 200 may be used to control inter-arrival timer operations when a processor exits a given low power state. In some implementations, method 200 may be performed by various logic within a processor such as logic of a PCU, in addition to other non-core circuitry such as an external transaction logic. As seen, method 200 may begin at block 210 by unblocking a memory during a low power state exit. Although the scope of the present invention is not limited in this regard, in a system implementing an ACPI specification, this low power state exit may correspond to an exit of a package deep low power state such as a package C6 state and entry into a pop-up state such as a package C2 state to thus handle an incoming transaction. In an embodiment, block 210 can be performed by logic of a PCU to thus unblock the memory. This unblocking may include re-enabling clocks to memory, restoring power to interfaces to memory, and bringing the memory out of self-refresh.

Next control passes to block 220 where an activity counter can be set to a programmable value. This activity counter, also referred to herein as an inter-arrival timer, may track the time elapsed from receipt in the external transaction logic of a last memory transaction. This timer may be set to a pre-programmed value. In an embodiment this pre-programmed value may be one of multiple such values, e.g., stored in a basic input/output system (BIOS) or another configuration location. The values may be defined based on testing of various workload types on a system.

That is, some embodiments, multiple programmable values may be stored, and the appropriate length of time to set the timer to can be determined based on the type of transaction. For example in such an embodiment, a transaction that is received as part of a deterministic flow such as transaction requests from a graphics engine seeking to fill a graphics buffer can be associated with one programmable value, while a transaction associated with a non-deterministic flow such as an incoming external memory transaction can be associated with a different programmable value, where this second programmable value associated with a non-deterministic pattern may be of a higher value than the programmable value associated with the deterministic pattern.

Still referring to FIG. 2, control next passes to block 230 where the inter-arrival timer can be updated. In an embodiment, this updating may be by decrementing the programmable value by one in the situation where the inter-arrival timer is a decrementing counter. In other embodiments, an incrementing counter may be present, in which case the timer value may be incremented. Next, it can be determined whether the timer has reached a predetermined threshold (diamond 240). In an embodiment, this predetermined threshold may correspond to the programmable value. If it is determined that the timer has reached this value, control passes to block 250 where a message can be sent to the PCU to indicate that the timer value has been reached. Accordingly, this provides an indication to the PCU that the programmable time duration after receipt of a last memory transaction has occurred without receipt of an additional memory transaction. Responsive to this indication, the PCU may cause an initiation into a deeper low power state.

Referring still to FIG. 2, if instead it is determined at diamond 240 that the timer has not reached the programmable value, control passes to diamond 260 to determine whether another memory request has been received in the external transaction logic. In other words, this determination is as to whether a second memory transaction is received prior to timeout of the timer. If not, control passes back to block 230 discussed above, where the timer can be updated again, e.g., decremented.

Otherwise if a request is received, it can be determined whether the request type is to be filtered (diamond 270). That is, certain requests such as memory requests originating from, e.g., a graphics engine or another content rendering device such as a high definition audio device, may be filtered from causing a re-arming of the timer value to its programmable value. This is so because the processor may include different mechanisms for knowing a wake pattern for such devices and to not pollute requests from other devices with such information. Otherwise if the request type is not to be filtered, e.g., the request is from an external peripheral device, control passes to block 220 discussed above where the inter-arrival timer can be re-armed that is, set to its programmable value. Accordingly, due to this additional incoming memory request, an additional duration of time (at least) is to occur prior to indicating a timeout to the PCU. Although shown at this high level in the embodiment of FIG. 2, understand the scope of the present invention is not limited in this regard.

Figure 3:
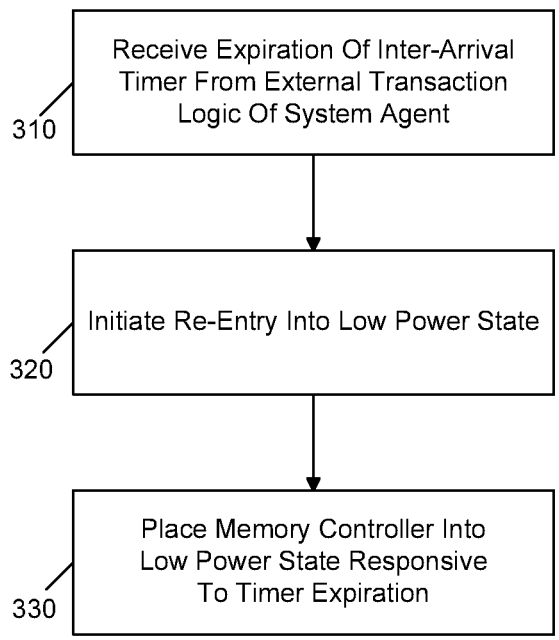
FIG. 3 is a flow diagram of a method for performing power management in accordance with an embodiment of the present invention.

Referring now to FIG. 3, shown is a flow diagram of a method for performing power management in accordance with an embodiment of the present invention. As shown in FIG. 3, method 300 may be performed by logic within a PCU. Specifically using method 300 the PCU can cause a re-entry into a deeper low power state responsive to a timeout of the inter-arrival timer discussed as to FIG. 2. As seen, method 300 may begin by receiving indication of the inter-arrival timer expiration from the external transaction logic (block 310). In an embodiment, this expiration indication may be via a message on a link coupled between the external transaction logic and the PCU. In different implementations, this message can be sent via a message channel virtual wire message or on a dedicated link between the external transaction logic and the PCU.

Responsive to receipt of this indication, control passes to block 320 where the PCU can initiate a re-entry into a given low power state. In an embodiment, this low power state can be a package C6 power state that is entered from the current pop-up package C2 state. To implement this power state transition, the PCU can perform various operations, including enabling clock and power gating for uncore transactions. Finally, at block 330 the PCU can place the integrated memory controller into a given low power state responsive to this timer expiration. When this operation occurs, the memory controller in turn can initiate power saving operations in the corresponding system memory. As an example, this memory can be placed into a self-refresh or other low power state. Although shown at this high level in the embodiment of FIG. 3, understand the scope of the present invention is not limited in this regard.

Figure 4:
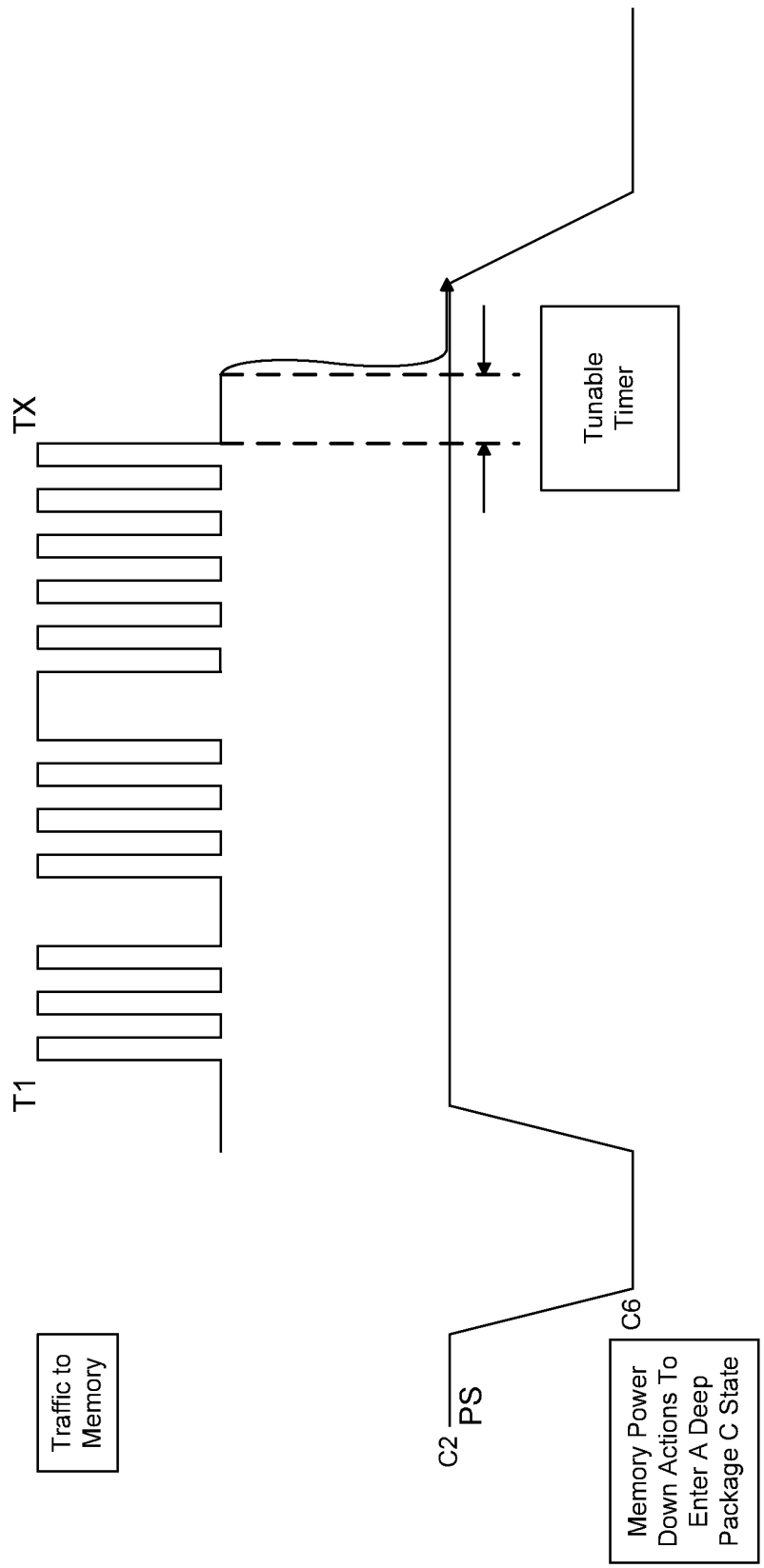
FIG. 4 is a timing illustration showing operations in accordance with an embodiment of the present invention.

Referring now to FIG. 4, shown is a timing illustration showing operations in accordance with an embodiment of the present invention. As shown in FIG. 4 a number of transactions T1-TX are incoming to a processor and are directed to a memory controlled by an integrated memory controller of the processor. Also shown in FIG. 4 is an indication of a power state of the processor, illustrated as curve PS. As seen, during a beginning of an interval, the processor is in a pop-up package low power state. As no incoming transactions are received at this time, the processor powers down to a deeper package low power state, e.g., a package C6 state and may further take actions to cause the coupled memory also to enter into a lower power state.

Then, a first incoming transaction T1 is received, causing the processor to exit the deeper low power state and enter into the pop-up package low power state (and also the memory exits its low power state as well). During a next portion of the interval a number of transactions are received such that the inter-arrival timer is continually reset and thus does not reach its programmable value or threshold level. However, after a last transaction TX, a time (e.g., according to a tunable timer) elapses without any further incoming transaction such that the timer timeouts. Accordingly, an external transaction logic or other processor logic can send an indication to a processor PCU to indicate this timeout and thus enable the PCU to cause the processor to enter into a deeper low power state and further to instruct the integrated memory controller to cause the corresponding memory also to take power management actions. Although shown with this particular set of transactions and power state transitions in the embodiment of FIG. 4, understand the scope of the present invention is not limited in this regard.

Figure 5:
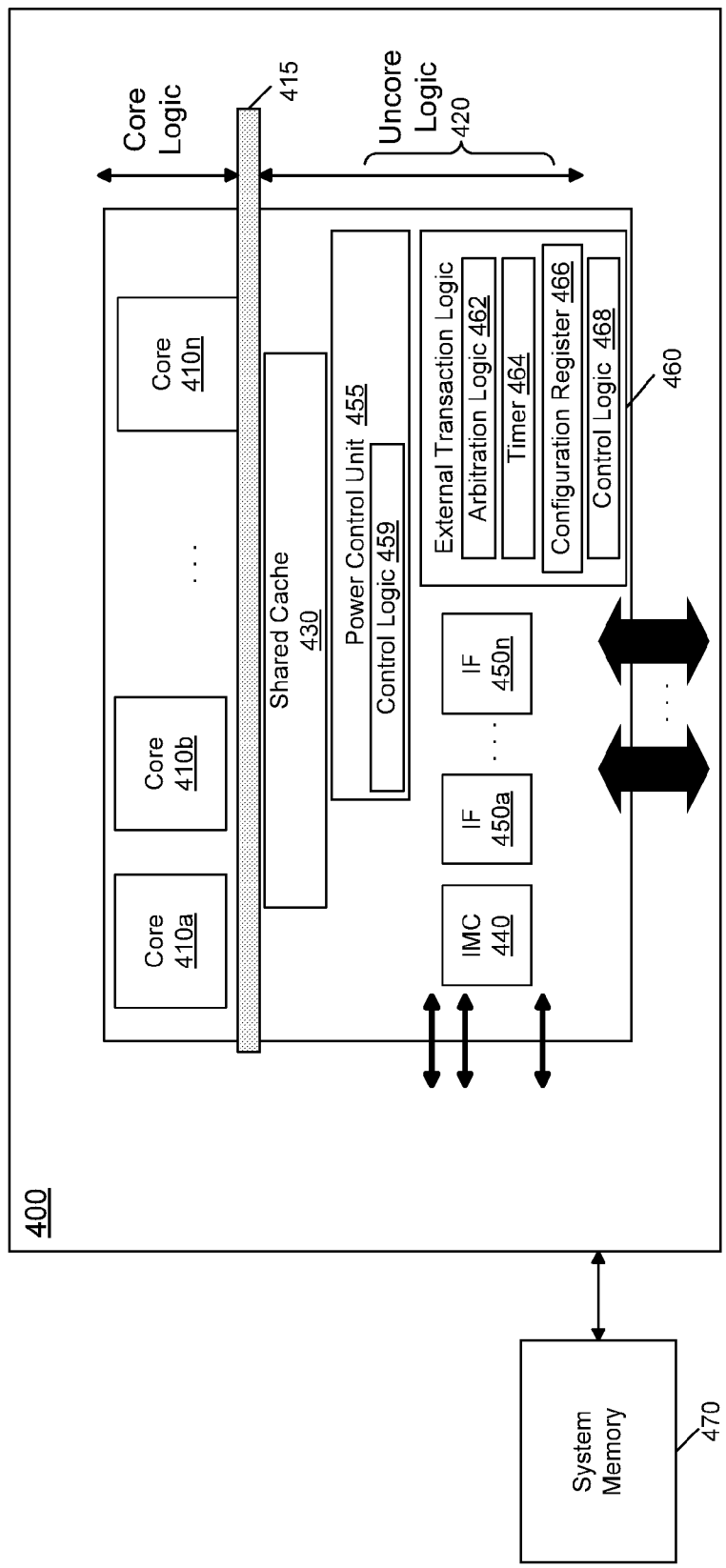
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller (IMC) 440, various interfaces 450 and a power control unit 455.

In various embodiments, power control unit 455 may include a transaction inter-arrival control logic 459 in accordance with an embodiment of the present invention. As described above, this logic can receive an indication of a timer timeout from an external transaction logic 460 and responsive to this indication perform operations to cause the processor to enter into a deeper package low power state, e.g., a package C6 state. In addition, logic 459 may further trigger power management operations with regard to an attached memory, namely a system memory 470, e.g., via IMC 440.

As further seen in FIG. 5, external transaction logic 460 includes an arbitration logic 462 that receives various incoming transactions from external agents and performs arbitration processing to identify an appropriate transaction for handling. In addition, an inter-arrival timer 464 may be present to determine when a programmable duration has occurred subsequent to receipt of a given external transaction. In an embodiment, this counter can be implemented as 13-bit counter that starts counting down from a preprogrammed value at a rate of 100 megahertz (MHz), when a transaction is received. The value of this programmable duration may be stored in a configuration register 466 or other storage which can be written by PCU 455. Note that this counter may also be set when an update to the programmable value, e.g., stored in configuration register 468 of the external transaction logic, is received. In some embodiments, transactions for certain devices can be filtered out from re-setting the counter. In some embodiments, a filter list can be provided where, if a given agent is present in an entry of the list, incoming transactions from the agent do not cause a counter reset. In another embodiment, configuration register 466 may further include fields for storage of filter indicators to indicate whether requests from corresponding agents are to be filtered (that is, to not cause resetting of the counter responsive to such requests). This filtering can be realized based on metadata associated with incoming requests, e.g., bus/device/function (BDF) and/or virtual channel (VC) information. As further seen, external transaction logic 460 further includes a control logic 468 to perform control operations, such as described above with regard to FIG. 2. While in some embodiments the timers and associated logic is present in the external transaction logic, in other embodiments external transaction logic 460 may communicate indications of transaction events to the PCU for handling of timing and associated logic within the PCU.

With further reference to FIG. 5, processor 400 may communicate with system memory 470, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard. For example, in some embodiments multiple inter-arrival timers may be provided. As one example, two timers may be present, one associated with transactions directed to memory and one associated with transactions directed to a processor interconnect (e.g., a ring interconnect that couples one or more cache memories and one or more cores). In this embodiment, these timers may be activated or armed when the memory is unblocked during package deep C-state exit (e.g., responsive to a power management request (PM_Req) handshake signal) and when the interconnect is similarly unblocked respectively. These timers may be reset when a corresponding transaction is sent into that specific domain (e.g., memory/interconnect). Then when one or more of these timers reaches a programmable value (e.g., approximately 5 µs in an embodiment), a fast path event can be triggered to cause the PCU or other processor logic to initiate a package C state re-entry.

Figure 6:
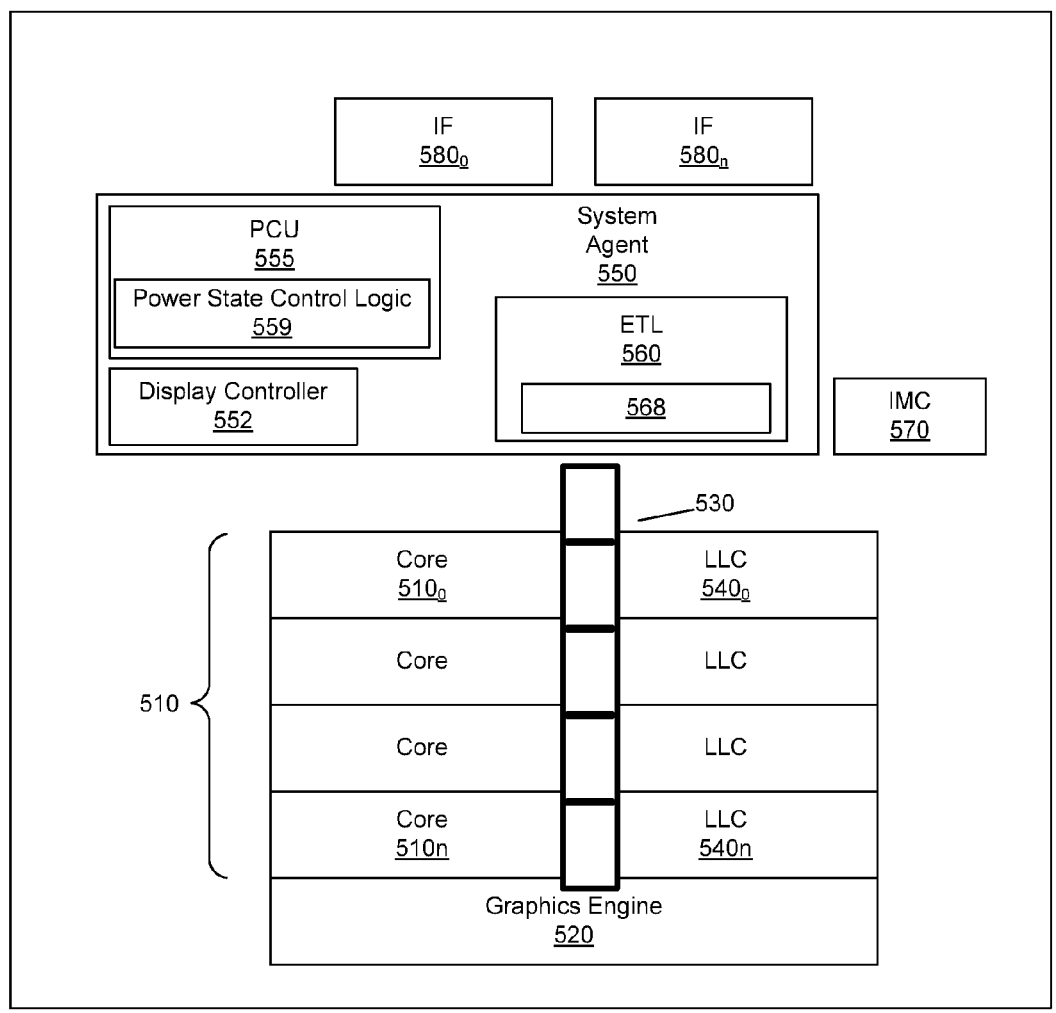
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a power state control logic 559 in accordance with an embodiment of the present invention to perform various power management activities with regard to the individual cores and the processor package as a whole, in addition to initiating power management operations for a coupled system memory (not shown for ease of illustration in FIG. 5). System agent 550 further includes an external transaction logic 560 including various arbitration and tracking mechanisms. This logic also includes a control logic 568 in accordance with an embodiment of the present invention to initiate and manage an inter-arrival timer responsive to receipt of a memory transaction while in a pop-up package low power state and to indicate expiration of the same to PCU 555.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
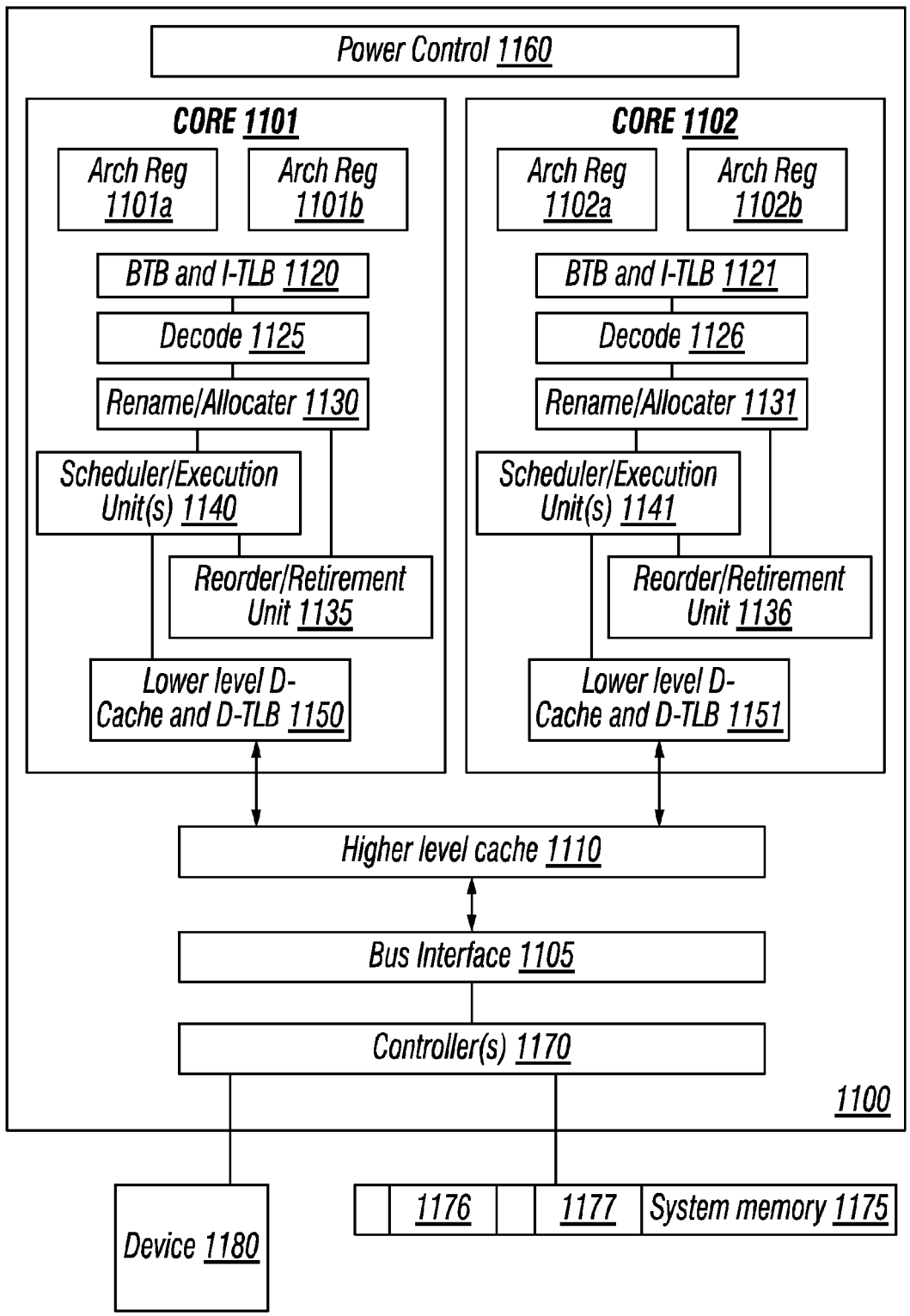
FIG. 7 is an embodiment of a processor including multiple cores.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
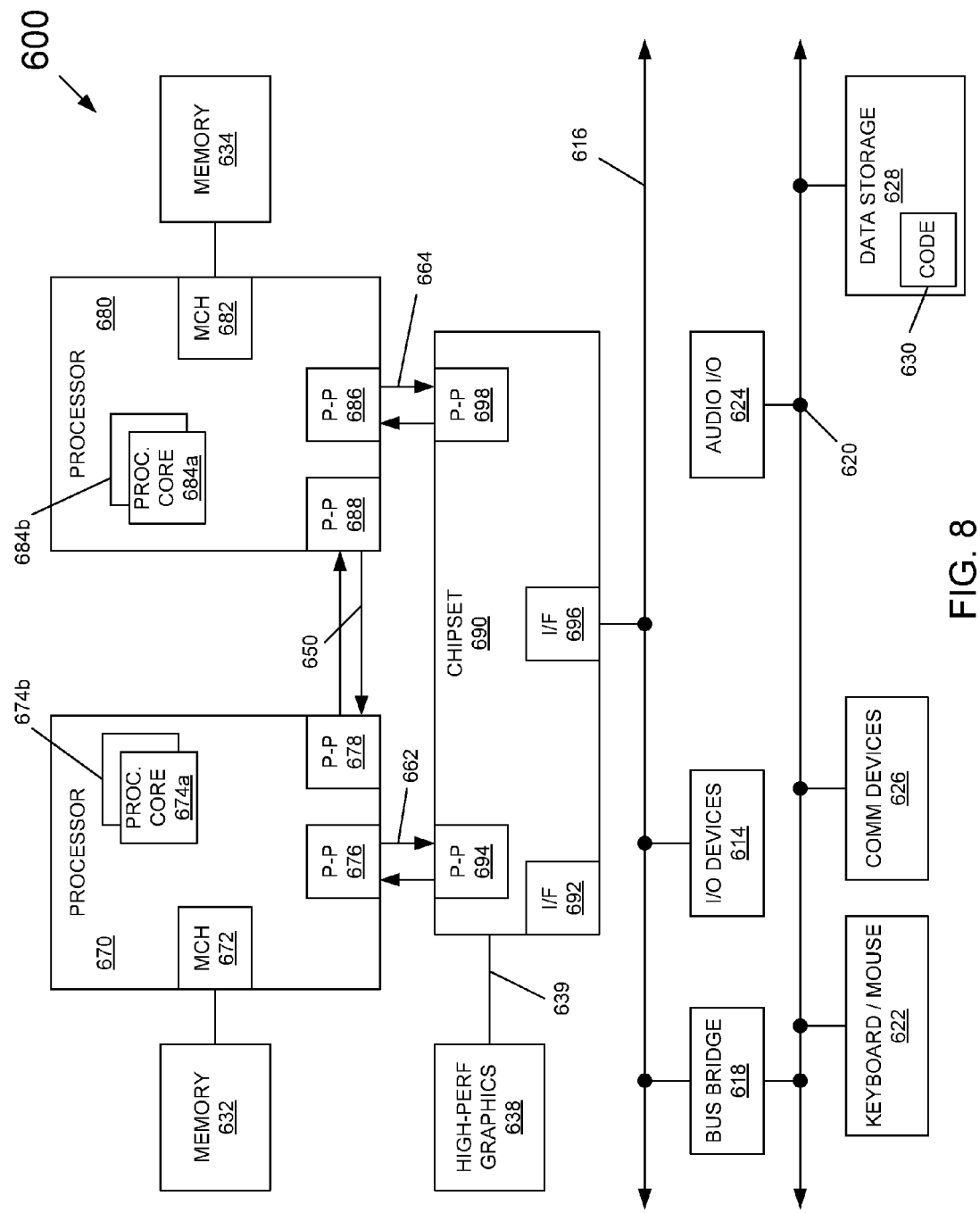
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a PCU, an external transaction logic and/or other logic to perform tracking of transactions during a pop-up package low power state and control of deeper low power state re-entry, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a die comprising:
a plurality of cores each to independently execute instructions;
an integrated memory controller coupled to the plurality of cores;
an external transaction logic to receive a transaction from an external source and initiate a timer responsive to receipt of the transaction; and
a power control unit (PCU) coupled to the plurality of cores and the external transaction logic to control power consumption of the processor, the PCU including a control logic to cause the processor to exit a first package low power state responsive to the receipt of the transaction in the processor and enter a second package low power state to handle the transaction and to re-enter the first package low power state from the second package low power state responsive to expiration of the timer, the expiration to indicate that a time duration subsequent to the receipt of the transaction in the processor has occurred without receipt of a memory transaction, the time duration corresponding to a programmable value based at least in part on a type of the transaction, and cause the integrated memory controller to enter into a power saving state and initiate a power saving operation in a system memory coupled to the processor.

2. The processor of claim 1, further comprising a configuration storage to store the programmable value, wherein the PCU is to cause the programmable value to be stored in the configuration storage.

3. The processor of claim 1, wherein the external transaction logic is to communicate the expiration of the timer to the PCU via a dedicated link coupled between the external transaction logic and the PCU.

4. The processor of claim 3, wherein the external transaction logic is to update the timer per clock cycle.

5. The processor of claim 3, wherein the external transaction logic is to reset the timer responsive to receipt of a second transaction in the processor prior to expiration of the timer.

6. The processor of claim 5, wherein the external transaction logic is not to reset the timer responsive to receipt of the second transaction when the second transaction is received from an agent present on a filter list.

7. The processor of claim 3, wherein the processor is to initialize the timer responsive to the transaction receipt after entry into the second package low power state corresponding to a pop-up low power state, and wherein the first package low power state is at a lower power consumption level than the pop-up low power state.

8. The processor of claim 3, wherein the external transaction logic is to send a message to the PCU via the dedicated link responsive to the expiration of the timer prior to receipt of a second transaction in the processor.

9. The processor of claim 3, wherein the external transaction logic is to set the programmable value to a first value when the transaction is received from a first agent, and to set the programmable value to a second value when the transaction is received from a second agent.

10. The processor of claim 9, wherein the first value is less than the second value, the first agent to send transactions to the processor according to a deterministic pattern, and the second agent to send transactions to the processor according to a non-deterministic pattern.

11. The processor of claim 1, wherein the processor is to select the programmable value from a plurality of programmable values based on the type of the transaction.

12. The processor of claim 1, further comprising a second timer, the timer associated with transactions directed to the system memory and the second timer associated with transactions directed to an interconnect of the processor that couples a cache memory of the processor to the plurality of cores.

13. A processor comprising:
  at least one core to execute instructions;
  an external transaction logic to receive an incoming transaction from an external source while the processor is in a first package low power state, to initiate a timer responsive to receipt of the incoming transaction and to send a message when the timer expires prior to receipt of a second incoming transaction, wherein the expiration is to indicate that a time duration subsequent to the receipt of the incoming transaction has occurred, the time duration corresponding to a programmable value based at least in part on a type of the incoming transaction;
  an integrated memory controller; and
  a controller coupled to the external transaction logic to receive the message and to cause the processor to re-enter a second package low power state responsive to receipt of the message, the second package low power state at a lower power consumption level than the first package low power state, and cause the integrated memory controller to enter into a power saving state and initiate a power saving operation in a system memory coupled to the processor.

14. The processor of claim 13, wherein the external transaction logic is to update the timer per clock cycle and reset the timer responsive to receipt of the second incoming transaction prior to the timer expiration.

15. The processor of claim 14, wherein the external transaction logic is to not reset the timer responsive to receipt of the second incoming transaction when the second incoming transaction is received from an agent to be filtered.

16. The processor of claim 13, wherein the controller is to cause the system memory coupled to the processor to enter into a lower power state responsive to receipt of the message.

17. A method comprising:
  setting a counter to a first programmable value responsive to receipt of an incoming memory access transaction in a first logic of a processor, the incoming memory access transaction to cause the processor to exit a first low power state and enter a pop-up low power state, the first programmable value based at least in part on a type of the incoming memory access transaction:
  determining if the first logic receives a second incoming transaction prior to the counter reaching the first programmable value;
  if so, resetting the counter, and otherwise initiating a re-entry into the first low power state; and
  sending a message to a power controller of the processor if the counter reaches the first programmable value, wherein the power controller is to cause the processor to re-enter the first low power state, and cause an integrated memory controller of the processor to enter into a power saving state and initiate a power saving operation in a system memory coupled to the processor.

18. The method of claim 17, further comprising updating the counter per cycle until the second incoming transaction is received or the counter reaches the first programmable value.

19. The method of claim 17, further comprising setting the counter to a second programmable value responsive to receipt of a third incoming memory access transaction in the first logic of the processor, the third incoming memory access transaction received from a third agent, the first memory access transaction received from a second agent, the second programmable value based at least in part on a type of the third incoming memory access transaction.

* * * * *